United States Patent [19]

Grant et al.

[11] Patent Number: 4,863,271

[45] Date of Patent: Sep. 5, 1989

[54] OPTICAL COMBINER FOR A RING LASER GYRO

[75] Inventors: David C. Grant, Thousand Oaks; Kevin D. Grobsky, Canyon Country, both of Calif.; Joseph J. Purrazzella, Southampton, N.Y.

[73] Assignee: Litton Systems, Inc., Beverly Hills, Calif.

[21] Appl. No.: 151,617

[22] Filed: Feb. 2, 1988

[51] Int. Cl.[4] ............................................. G01C 19/64
[52] U.S. Cl. .................................................... 356/350
[58] Field of Search ......................................... 356/350

[56] References Cited

U.S. PATENT DOCUMENTS

| | | | |
|---|---|---|---|
| 3,332,314 | 7/1967 | Rosenthal | 356/350 |
| 3,484,169 | 12/1969 | Skalski et al. | 356/350 |
| 3,527,535 | 9/1970 | Monroe | 356/71 |
| 4,449,824 | 5/1984 | Matthews | 356/350 |
| 4,473,297 | 9/1984 | Simpson et al. | 356/350 |
| 4,514,832 | 4/1985 | Vescial | 356/350 |
| 4,526,469 | 7/1985 | Egli et al. | 356/350 |
| 4,582,429 | 4/1986 | Callaghan | 356/350 |
| 4,632,555 | 12/1986 | Malvern | 356/350 |
| 4,676,643 | 6/1987 | Vescial | 356/350 |

OTHER PUBLICATIONS

Forshaw, "An Experimental Ring Laser Rotation Sensor", Proc. of Joint Conf. on Infrared Technoues, Reading-Berko, England, (Sep. 21-23, 1971), pp. 389-396.
Macek et al., "The Ring Laser" Sperry Eng. Rev., vol. 19 (1966) pp. 9-15.

Primary Examiner—Vincent P. McGraw
Attorney, Agent, or Firm—Roy L. Brown

[57] ABSTRACT

The apparatus of this invention is a composite combining prism for combining the beams of a ring laser gyro. It uses a composite prism whose trunk is fabricated of two substantially identical juxtaposed sub-prisms having beam splitters in the region where laser beams cross their common boundary. The beam splitter regions are very thin dielectric films, typically no thicker than a fraction of a wavelength of the laser light. Dielectric films, such as titanium dioxide, are used for the splitters so that the geometrical path lengths of interfering beams are almost exactly the same. To make the path lengths optically the same, the two sub-prisms and the substrate of the partly transmitting corner mirror of the ring laser preferably have the same index of refraction. In a first embodiment, the outwardly-extending trunk of the assembled composite prism is substantially rectangular in cross-section. It is split into two identical sub-prisms with negligible-thickness beam splitters at the common interface of the sub-prisms. It has a slanted outward end carrying two combining light heterodyne sensors. To reduce the outward extension of the prism from the ring laser gyro another embodiment has the composite prism lying flat on the substrate of the partly transmitting corner mirror. It uses a forty five degree prism surface to turn the laser light through a right angle to deliver the outwardly directed laser beams into a direction parallel to the surface of the mirror substrate.

8 Claims, 10 Drawing Sheets

OPTICAL COMBINER FOR A RING LASER GYRO

BACKGROUND OF THE INVENTION

Ring laser gyros use ring lasers whose laser path is usually imbedded in a dimensionally stable block of glass-ceramic material. Usually a closed gas-filled bore is fabricated with three or more, typically four, corner mirrors to circulate counterpropagating laser beams around a closed path. Means are provided to deliver energy to the laser. As the laser is turned around an axis enclosed by the laser path, the Sagnac effect causes the two counterpropagating laser beams to vary in frequency. The difference in frequency between the beams is a measure of the angular velocity of the turning about that axis.

To determine the difference in frequency between the two beams, one of the corner mirrors transmits a part of both beams through its transparent substrate. At the data of this writing, the amount of transmitted beam is on the order to 0.01% of the beam's energy. An optical combining system is used to combine the two beams to obtain moving interference fringes that may be counted. The rate of the counter is then a measure of the angular velocity of the ring laser about its sensing axis, while the direction of fringe motion indicates the sense of rotation.

In the prior art, parts of the two counterpropagating beams are also extracted at a second corner mirror, and the intensities of the extracted laser beams are monitored and used to servo the inward and outward motion of one or more of the other corner mirrors to tune the laser cavity.

Because of the extra energy escaping from the ring laser when light is extracted at two of its corner mirrors, the finesse of the ring laser cavity is reduced. Reduction of the finesse of the ring laser reduces its accuracy as a measuring instrument.

In many situations, it is important to keep the bulk of the ring laser instrument as small as possible.

It is common to dither ring laser gyros around their sensing axis. When the optical beam combiner extends outward from the ring laser, because of the increased moment of inertia more energy is expended in dithering the gyro. Further, the combiner acts like a pendulum, and its pendulosity unbalances the ring laser. More counter-weights must be added or more mass must be removed to balance the ring laser. Larger counter-weights increase the moment of inertia and more energy is required for the dithering. A larger enclosing structure is needed for the outwardly extending combiner.

When combining mirrors or prisms for ring laser gyros produce different path lengths for the two counterpropagating beams, a significant phase shift occurs in the sensed fringe information, over ambient temperature changes, thereby introducing an error into the instrument. The claimed apparatus herein has a beam-splitting mirror and a glue line of finite but very small thickness. That the path lengths thus are slightly different for the two beams, and that difference is temperature sensitive, but very small.

BRIEF DESCRIPTION OF THE INVENTION

In some of the embodiments of the invention, only one partly transmitting corner mirror is used in the laser cavity, and the finesse of the ring laser is thereby improved.

The apparatus of this invention on a single corner mirror of a ring laser gyro, uses a composite prism whose trunk is fabricated of two substantially identical juxtaposed sub-prisms having beam splitters in the region where laser beams cross their common boundary. The beam splitter regions are very thin dielectric films, typically no thicker than a fraction of a wavelength of the laser light. Dielectric films, such as titanium dioxide, are used for the splitters so that the geometrical path lengths of interfering beams are almost exactly the same. To make the path lengths optically the same, the two sub-prisms preferably have the same index of refraction, and, in all embodiments, the output mirror should be essentially a plane parallel. It should be noted that a plano substrate with a thirty arc second or more wedge is all but intolerable since it produces fringes which are out of the range of the combining optics unless the wedge angle is properly oriented with respect to the lasing plane. It would appear that the above statement excludes curved mirrors as output mirrors, but in practical cases this is not so. For example, for mirrors whose radius of curvature is in the one to ten M range, the height of the chord is approximately ten Angstroms. In the worst case for a mirror 0.8 inch or about two centimeter in diameter, the maximum usable wedge is about $10^{-4}$ arcseconds which is negligible.

The glue line is the only assymetric part of this prism and is of the order of 100 wavelengths thick. This represents a significant reduction in the centimeter type difference in previous designs. Furthermore the difference in pathlength may be removed by taking the differential output of two heterodyne sensors.

In some preferrred embodiments of the invention, the optical combiner is fabricated in four parts, and it is important that all parts are of substantially the same material as the mirror substrate: frequently a dimensionally stable material such as that known by the trade mark Zerodur.

In a first embodiment, the outwardly-extending trunk of the assembled composite prism is substantially rectangular in cross-section. It is split into two identical sub-prisms with negligible-thickness beam splitters and glue line at the common interface of the sub-prisms. It has a slanted outward end carrying two light combining Meterodyne sensors.

The two laser beams entering the mirror are refracted and diverge continuing, in the sub-prisms of the trunk, toward two opposite side faces of the composite prism. At the regions intercepting the diverging laser beams, the opposite side faces form beam splitters which reflect the received beams while also transmitting them. The reflected laser beams converge in regions of the common boundary between the two touching sub-prisms, and substantially-no-thickness beam splitters are positioned in the reflected beams at those regions. The beam splitters at the boundary both reflect and transmit their intercepted laser beams. The reflected and transmitted beams interact or heterodyne to form light fringes, and light heterodyne sensors are placed on the ends of the sub-prisms to intercept the fringes. The composite prism is turned slightly, on the order of one minute of arc, about an axis that is parallel to the plane of the ring laser path and the common plane between the two sub-prisms. The turning of the composite prism causes one or the other of the double light heterodyne sensors to sense the motion of the fringes before the other one of the double light heterodyne sensors senses it, and the direction of rotation of the ring laser is determined by which heterodyne sensor first detects a particular fringe. The count rate of the fringes is a measure of the angular velocity of the ring laser.

Although in a first embodiment, the laser light travels outward fromthe partly transmitting ring laser corner mirror substrate, to reduce the outward extension of the prism from the ring laser gyro a second embodiment has the composite prism lying flat on the substrate of the partly transmitting corner mirror.

The second embodiment uses a forty five degree prism surface to turn the laser light through a right angle to deliver the outwardly directed laser beams into a direction parallel to the surface of the mirror substrate.

The first two embodiments also have auxiliary prisms appended to the sub-prisms, supporting auxiliary light amplitude sensors used for controlling the path length of the ring laser. The regions intercepting the deverging laser beams, on the opposite side faces, form beam splitters which reflect the received beams while also transmitting them through the auxiliary prisms into the two light amplitude sensors. The latter amplitude sensors produce electrical signals, that are measures of the intensity of their intercepted beams, for tune the cavity.

In a third embodiment of the invention the sub-prisms are right triangular prisms, and the composite prism is triangular. It has no auxiliary prisms and only the light combining light heterodyne sensors. As in the prior art, path length is controlled from a second corner mirror. Alternately, this may have a forty five degree reflecting face as in the second embodiment.

Therefore, it is a feature and an object of this invention to deliver a portion of interfering counterpropagating ring laser beams along substantially equal optical path lengths to at least one heterodyne light sensor.

It is also a feature and an object of this invention to provide a non-temperature-sensitive optical combiner for a ring laser gyro.

It is a further object of the invention to reduce the outward extension of the combining prism of a ring laser gyro.

It is a more specific object of this invention to use a new composite prism configuration for delivering the counterpropagating beams of a ring laser gyro to light heterodyne sensors.

It is likewise a feature and an object of this invention to extract a portion of the counterpropagating laser beams from a ring laser at only one corner mirror and to use such extracted beams to produce both cavity control signals and signals that are measures of the angular velocity and the direction of angular velocity of the ring laser about its sensing axis.

Other objects will become apparent from the following description, taken together with the accompanying drawings.

DETAILED DESCRIPTION OF THE PREFERRED EMBODIMENT

Figure 1:
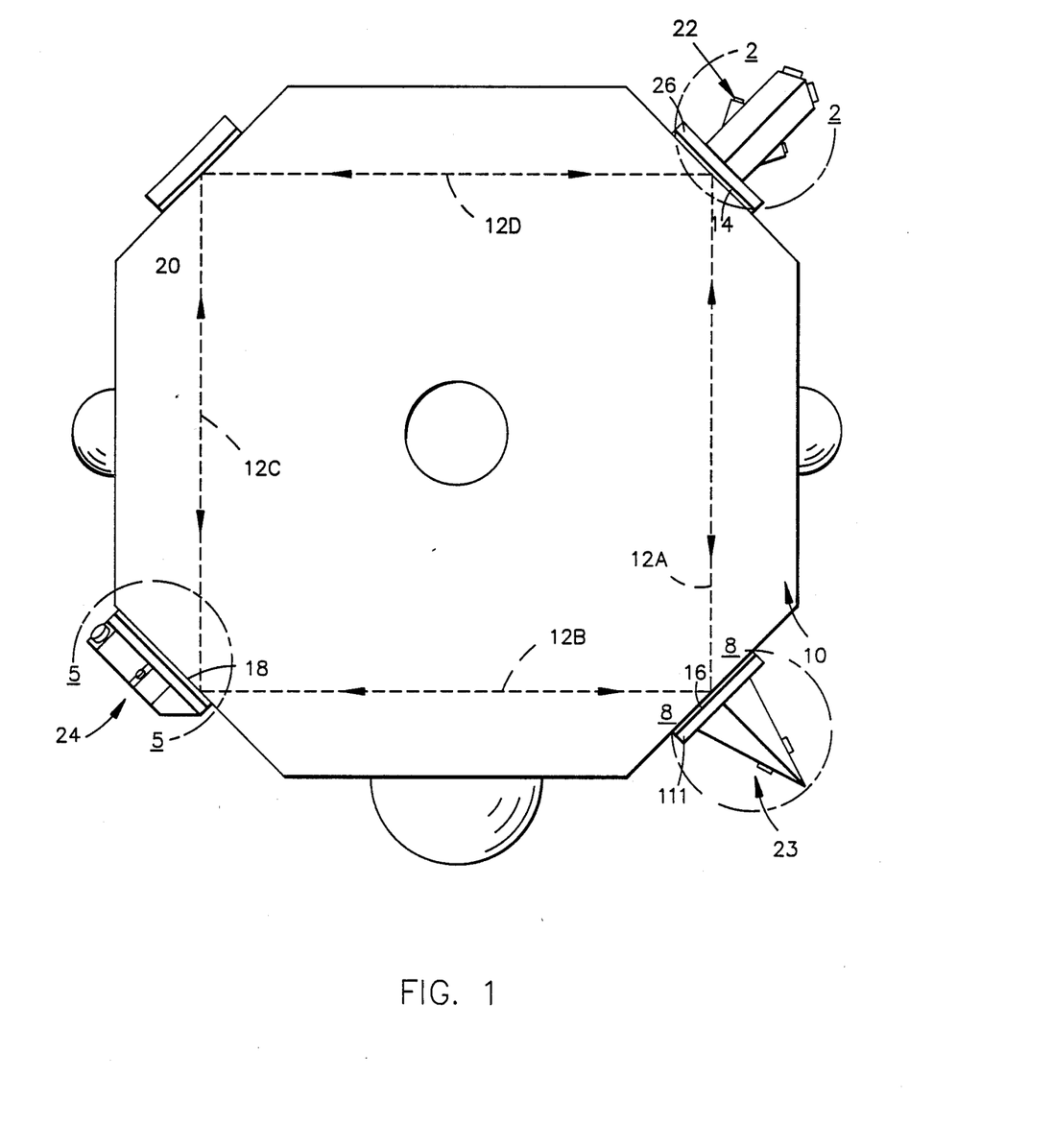
FIG. 1 is a profile view of a typical four-corner-mirror ring laser, showing three embodiments of the combining prism of the invention.

A typical four-corner-mirror ring laser block 10 is shown in FIG. 1. The bores 12A, B, C, D intersect at the corner mirrors 14, 16, 18, 20. A prism structure 22, according to a first embodiment of the invention, is shown at the mirror 14; a prism structure 24, according to a second embodiment of the invention, is shown at the mirror 18; and a prism structure 23, according to a third embodiment, is shown at mirror 16. A ring laser would have only one of prisms 22, 23, 24, but they are all shown, for convenience and comparison, on the same Figure.

Figure 2:
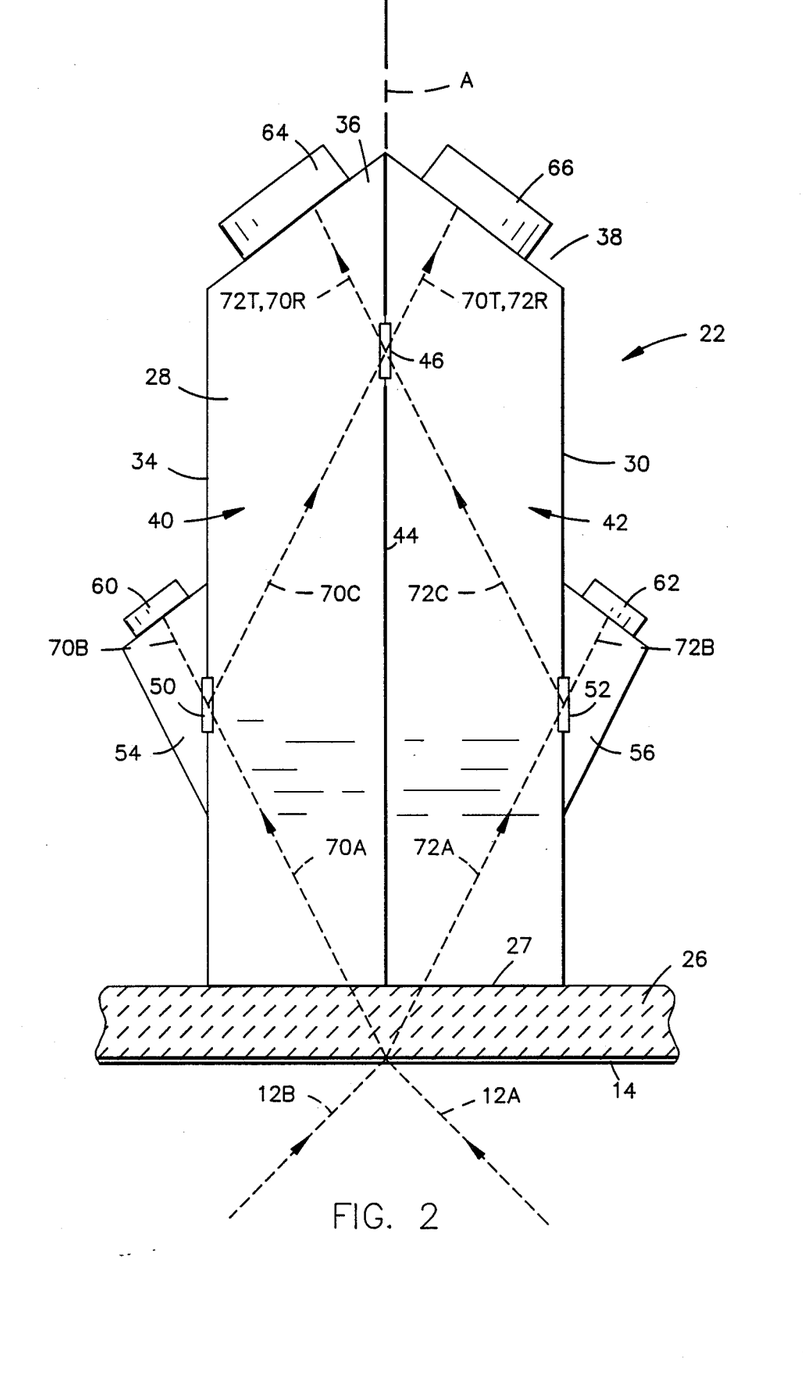
FIG. 2 is an enlarged profile view of a first embodiment of the invention, at 2—2 in FIG. 1, showing the direction of beam propagation within the prism.
Figure 3:
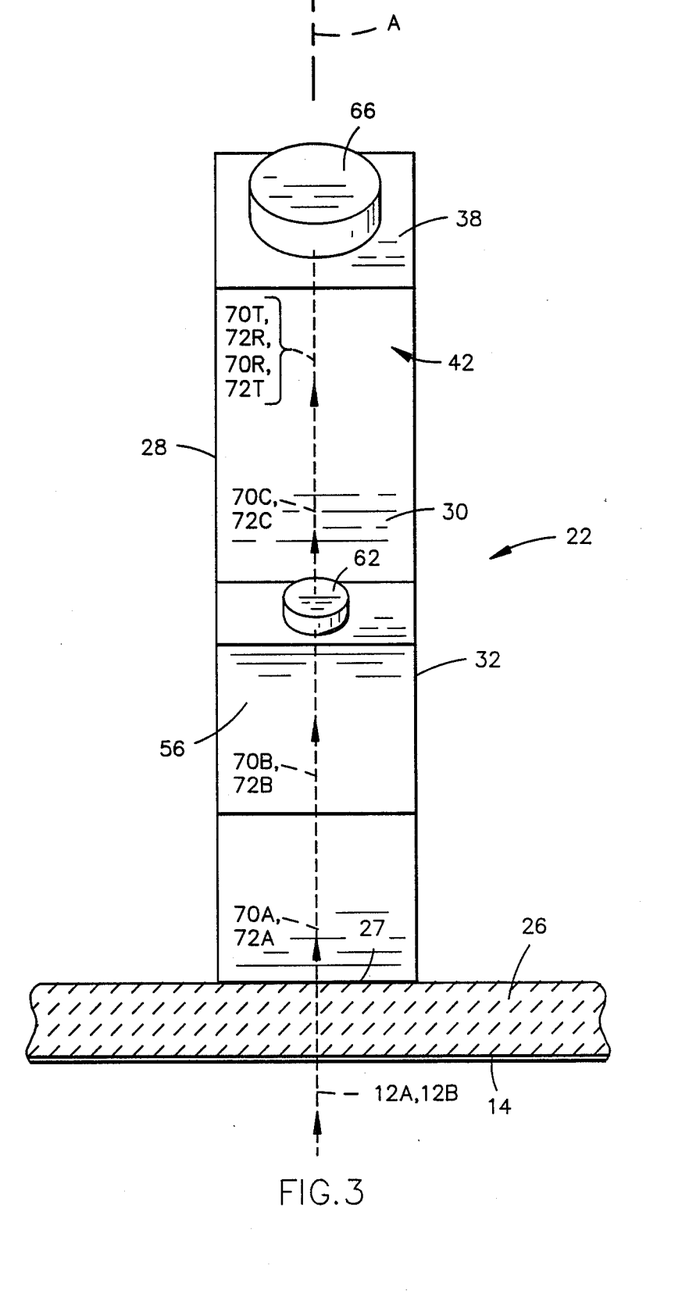
FIG. 3 is a view taken from the right in FIG. 2, showing beam directions.
Figure 4:
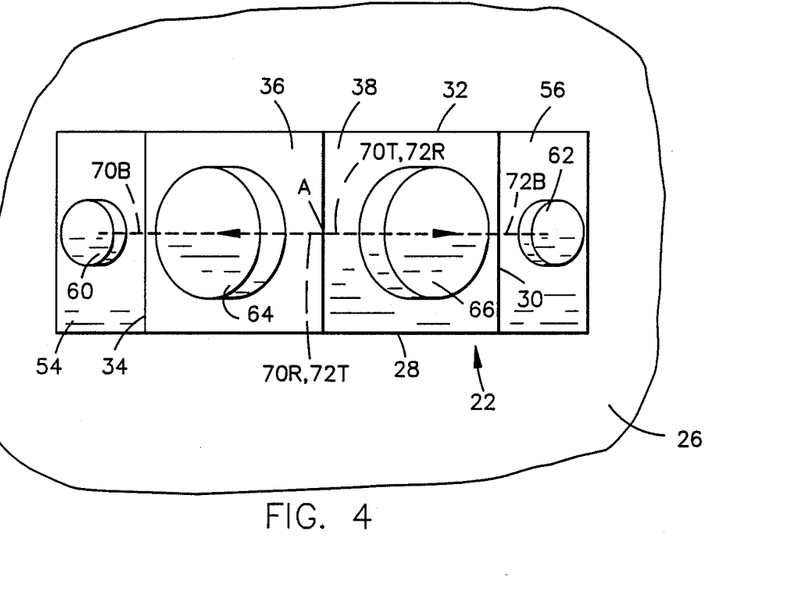
FIG. 4 is a view taken from the top in FIG. 2, showing the beam directions.

The description of structure 22 may be understood from FIGS. 2, 3 and 4. The mirror 14 has a substrate 26. Upstanding on the substrate 26 is the composite rectangularly shaped column prism 22. All of the faces of the composite prism 22 are planar. The base 27 of the composite prism 22 is mounted upon the substrate 26, and it typically is glued to the substrate. The composite prism 22 is formed of a rectangular-cross-section shaped column whose faces 30, and 34 are shown upright, perpendicular to the base 27, and parallel to each other. The other side surfaces 28 and 32 are not critical because the laser beams do not cross those surfaces. The top of the composite column prism 22 is formed of two intersecting planar surfaces 36 and 38 inclined at such an angle that the incident beams are about ten degrees from the normal. The composite prism 22 is fabricated of two pieces or sub-prisms 40 and 42, fastened together at the interface surface 44. The surface 44 at the common boundary between the pieces 40 and 42 is preferably an absorbtion layer except that a beam splitter mirror 46 is positioned where that boundary is penetrated by the incoming laser beams. Although the beam splitter 46 is shown with a substantial thickness, in practice it is a thin film that is tuned to the laser frequency and has a thickness that is only approximately a wavelength of the laser beam.

The glue line is the only assymetric part of this prism and is of the order of 100 wavelengths thick. This is a significant reduction in the centimeter type difference in pathlength of previous designs. Furthermore the temperature sensitive error caused by the difference in pathlength may be removed by taking the differential output of two heterodyne sensors 64 and 66 which are positioned symmetrically.

At least the regions 50 and 52 of the faces 34 and 30 of the members 40 and 42 must be both light-reflecting and light-transmitting. The regions 50, 52 are shown with a thickness, but that is only to designate the region. They may in fact be very thin films similar to the beam splitter 46. Two auxiliary prisms 54 and 56 extend outward from and are attached to the surfaces 34 and 30, respectively, to receive light through the regions 50 and 52.

The light heterodyne sensors 64 and 66 are dual to sense fringes generated by the beat frequency between the two counterpropagating laser beams. The fringes travel over the faces of the dual heterodyne light sensors, and the phase difference between the lights from the two heterodyne sensors of each dual heterodyne light sensor package is used to determine the direction of rotation of the ring laser gyro.

The mirror substrate 26, the prism parts 40, 42, and the auxiliary prisms 54, 56 are preferably fabricated of a dimensionally stable glass-ceramic material such as that material known by the trademark "Zerodur".

Because the incoming laser beams transit through the surface of the counter-propagating laser beams 12B, 12A enter the mirror surface 14, and, as shown at 70A, 72A, they are refracted in the substrate 26 and the sub-prisms 40, 42. They are, as shown at 70C, 72C, reflected at 50, 52 into the region 46 of the common boundary 44 between the prisms 40, 42. At the region 46 the beams 70T, 72T are transmitted and the beams 70R, 72R are reflected into the dual heterodyne light sensors 64 and 66.

A slight rotation, on the order of one minute or less or arc, of the structure 22 about an axis A, normal to the mirror 14 causes the beams to be slightly separated so that interference fringes between the beams intercept the dual heterodyne sensors in sequences indicative of the direction of rotation of the ring laser about its sensing axis.

The laser beams are transmitted, as shown at 70B, 72B, through the surface 30 at 52 and through the surface 34 at 50 into the auxiliary prisms 54, 56 and into the light amplitude sensors 60, 62 to control the ring laser path length.

Figure 5:
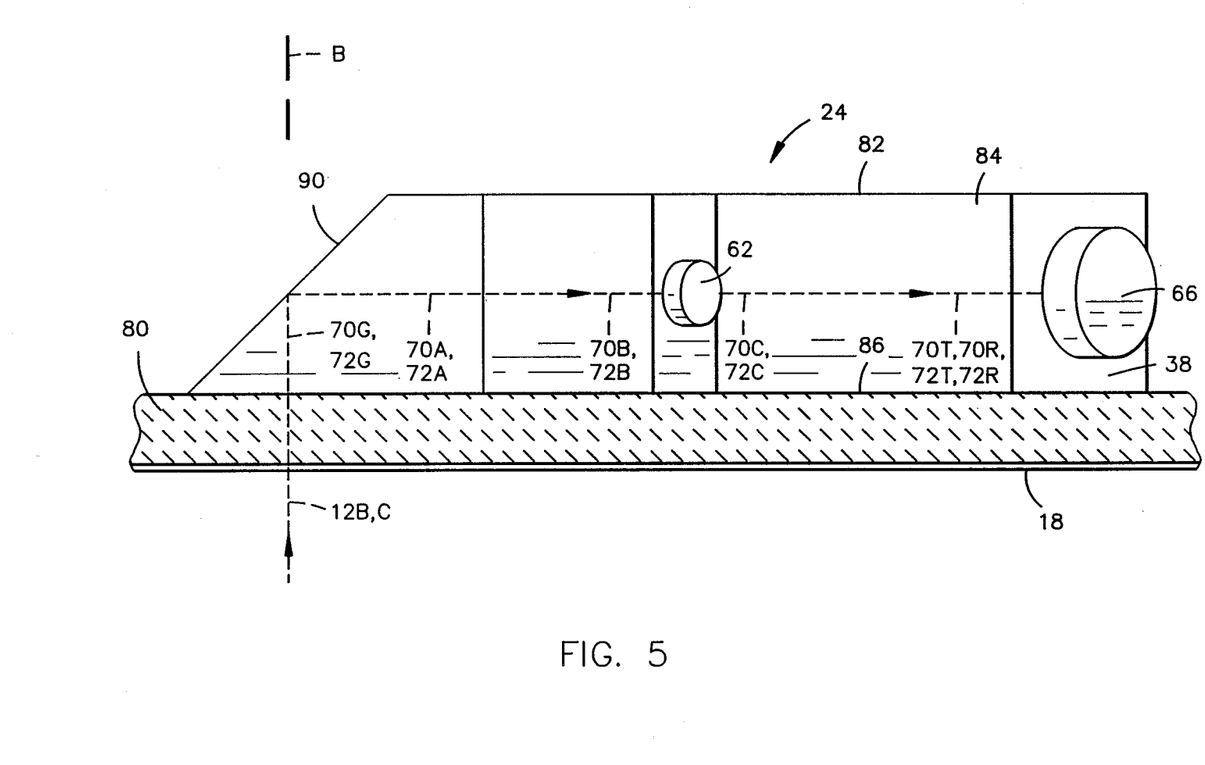
FIG. 5 is a view of the prism used in the second embodiment, at 5—5 in FIG. 1, of this invention, showing the direction of the laser beams through the prism.

FIG. 5 is a view of the prism used in the second embodiment of this invention, further showing the forty five degree prism surface 90 for turning the light parallel to the substrate 80 of the corner mirror 18. Certain numbers are common to FIGS. 2–4 and to FIGS. 5–7. The composite prism 22 is laid on its side as shown at 24 in FIG. 5. Instead of being upright, the apparatus 24 is reclined onto 86. Because the incoming laser beams transit through the surface of the face 86, which is in contact with the substrate 80. The prism is in the general shape of a rectangular-cross-section prism with a forty five degree right angle prism face 90 on one end to channel the laser beams into a direction parallel to the substrate. The faces 82, 84, 86, 88 correspond to the faces 28, 30, 32, 34 of the prism structure of FIGS. 2–4, except that face 86, because it contacts the substrate 80, is critical, and face 82 is not critical. The composite prism structure 24 is formed of two sub-prisms 91, 92 corresponding to prisms 40, 42, with a common contacting boundary 44 and beam-splitter 46. The two auxiliary prisms 54, 56 and the sensors, 60, 62, 64, 66 of the first embodiment also appear on the second embodiment. On the end of the composite prism structure 24, is a forty five degree ramp surface 90 depending from the surface 82 toward the surface 86 and the substrate 80. The ramp is divided by the surface 44. The counterpropagating laser beams 12B, 12C, as shown at 70G, 72G, are refracted by the substrate 80 and the composite prism structure 24. Upon intercepting the inclined surface 90, the beams are re-directed, as shown in FIG. 5, into a direction lengthwise of the structure 24 parallel to the surface 82. The laser beams then diverge and re-combine exactly as shown in FIGS. 2–4 described above.

Figure 6:
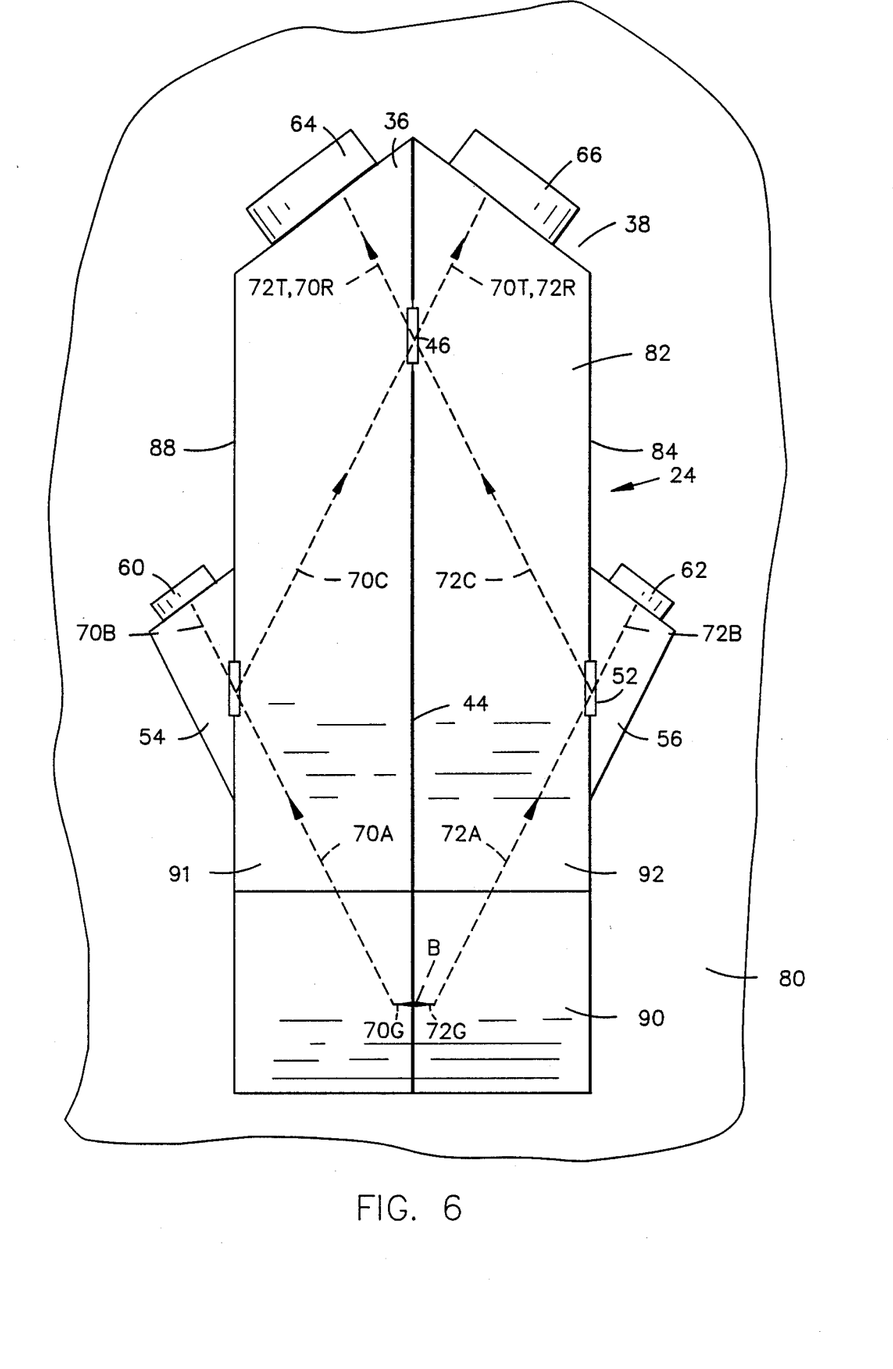
FIG. 6 is a view taken from the top in FIG. 5, showing beam directions.
Figure 7:
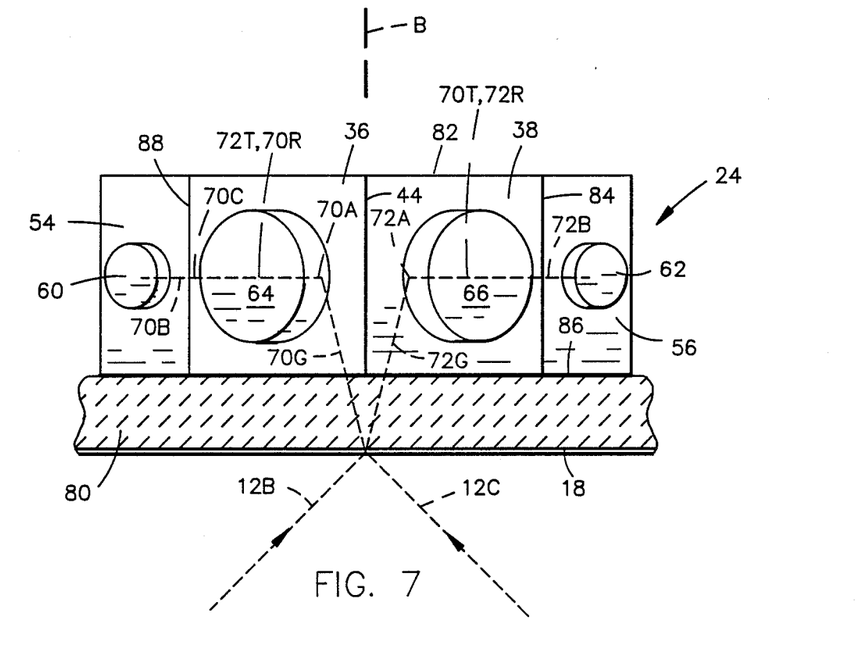
FIG. 7 is a view taken from the side in FIG. 6, showing beam directions.

A slight rotation, on the order of one minute or less or arc, of the structure 24 about an axis B, normal to the mirror 18 causes the beams to be slightly separated so that interference fringes between the beams intercept the dual heterodyne sensors in sequences indicative of the direction of rotation of the ring laser about its sensing axis.

Thus, the first two embodiments are identical in all respects except that the second embodiment has a substantially (but not necessarily precisely) forty five degree prism face that causes the composite prism to be mounted on with its long side 86 adjacent the corner mirror substrate 80, thereby making it more stable during vibrations and compact for packaging.

Figure 8:
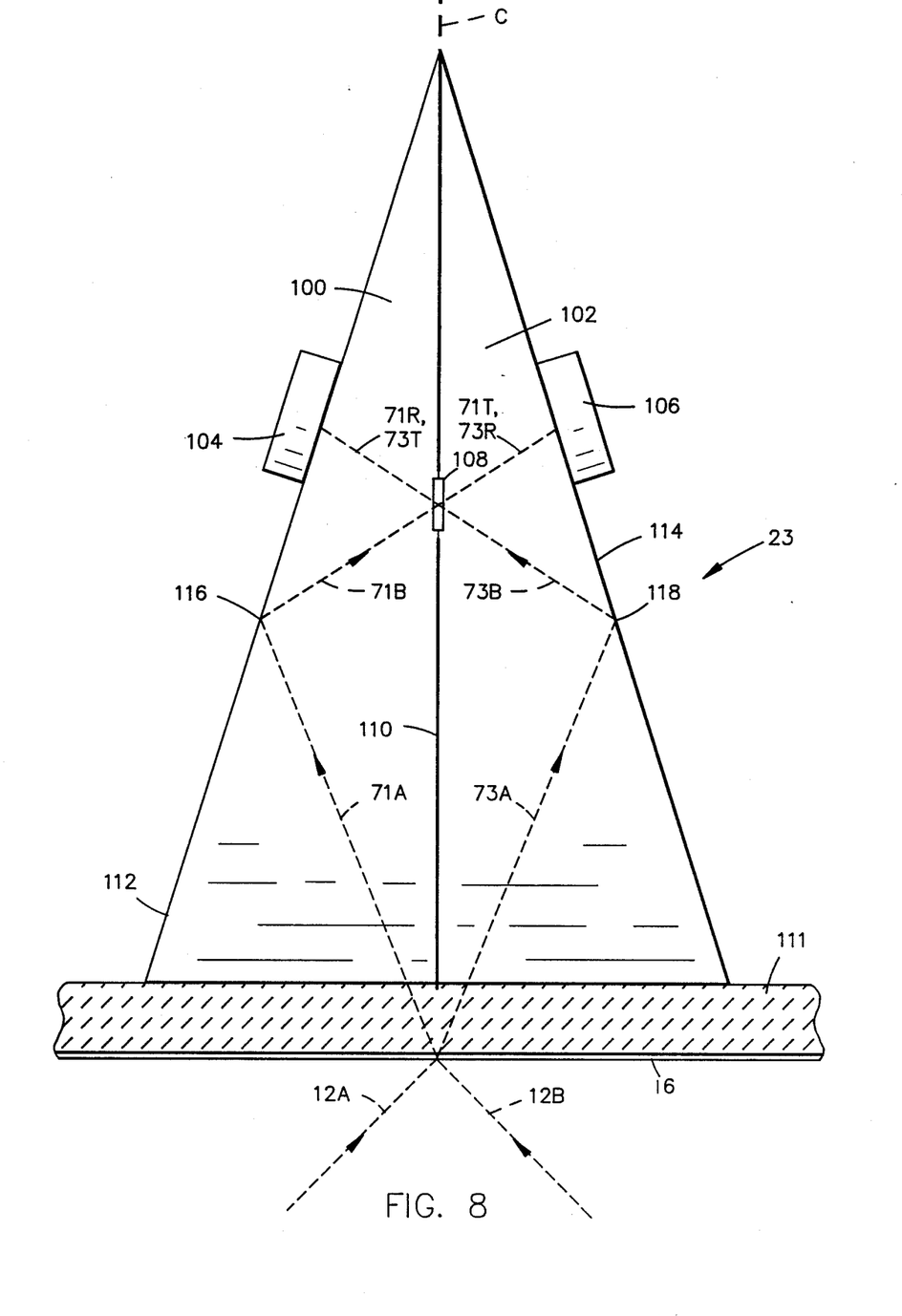
FIG. 8 is a view of the prism used in the third embodiment, at 8—8 in FIG. 1, of this invention, showing the direction of the laser beams through the prism.
Figure 9:
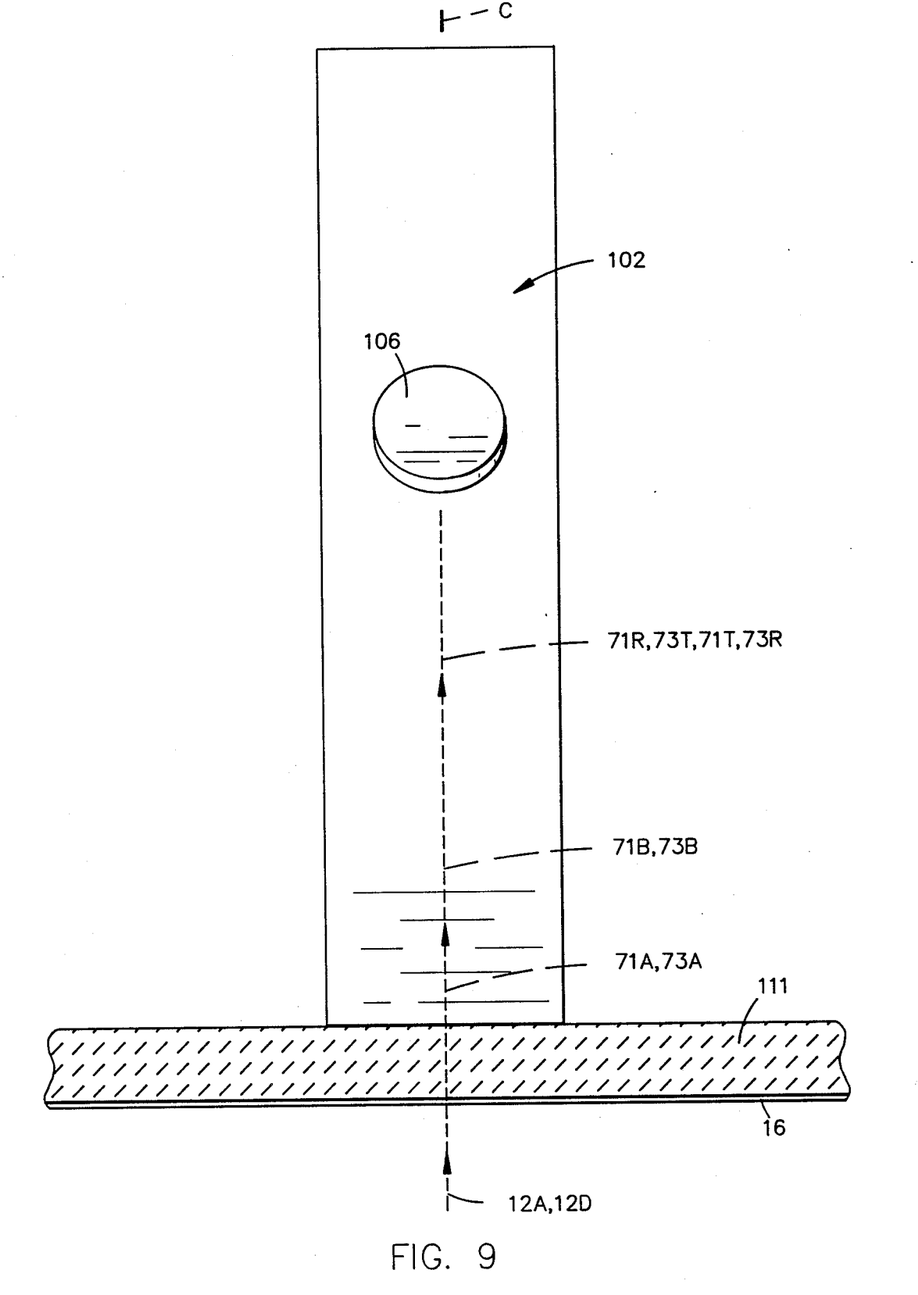
FIG. 9 is a view taken from the right in FIG. 8, showing beam directions.
Figure 10:
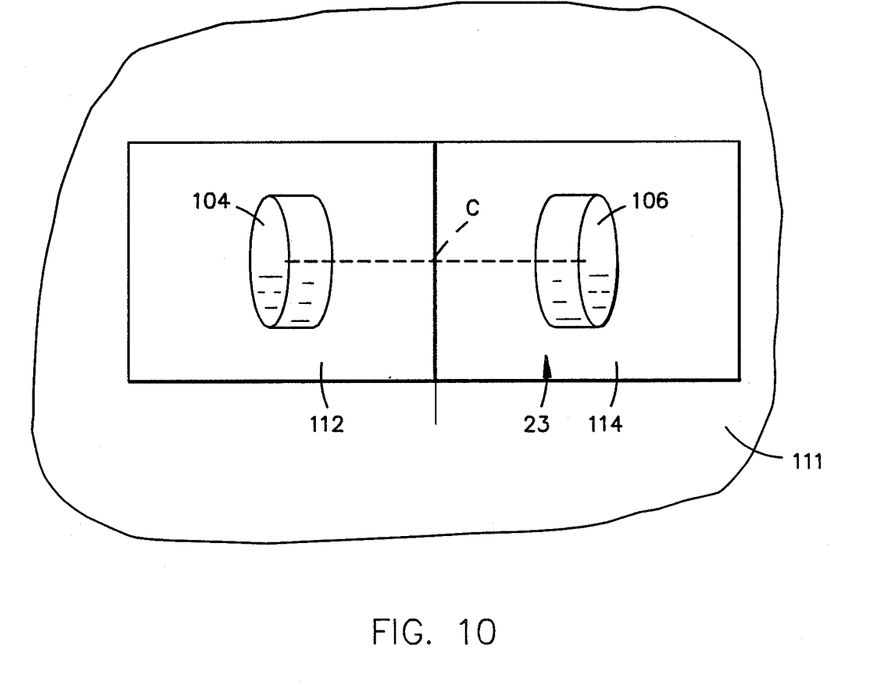
FIG. 10 is a view taken from the top in FIG. 8, showing beam directions.

The third embodiment 23 of the invention is shown in FIGS. 8–10 and at 8—8 in FIG. 1. It comprises two triangular sub-prism 100, 102 which preferably are very acute. In a typical sub-prism the apex angle is on the order of eighteen degrees with the base angle about seventy two degrees. Positioned on each hypotenuse surface of a sub-prism is a heterodyne light sensor, preferably a dual heterodyne light sensor 104, 106 are positioned upon the hypotenuse surfaces of the sub-prisms. A substantially-no-thickness beam splitter 108 is positioned at the boundary face 110 between the sub-prisms.

The ring laser beams 12A and 12B are extracted through mirror 16 and mirror substrate 111, whence they are refracted and delivered through the sub-prisms 100, 102, as beams 71A and 73A, to the hypotenuse faces 112, 114. Preferably the beams are perfectly reflected by total internal reflectance at the faces 112, 114. They may, however, carry a mirror (not shown) at the points of interception 116, 118. If they do carry such mirror, the values of apex and base angles may be changed to become somewhat less acute at the apex, or more acute approaching the embodiment of FIG. 2 as a limit. The beams 71A, 73A are reflected at 116, 118 into beams 71B, 73B which intercept the common boundary 110 between the sub-prisms 100, 102 at the beam splitter 108. Beam Splitter 108 is very thin, preferably having a thickness on the order of one wave length of the laser beam. The beams are transmitted into beams 71T, 73T and reflected into beams 71R, 73R. Beams 71R, 73T enter dual light heterodyne sensor 104 positioned on the hypotenuse face 112 of the sub-prism 100. Beams 71T, 73R enter dual light heterodyne sensor 106 positioned on the hypotenuse face 114 of the sub-prism 102.

If desired, the sub-prisms above the heterodyne sensors 104, 106 may be truncated (not shown).

A slight rotation, on the order of one minute or less of arc, of the structure 23 about an axis C, normal to the mirror 16 causes the beams to be slightly separated so that interference fringes between the beams intercept the dual heterodyne sensors in sequences indicative of the direction of rotation of the ring laser about its sensing axis.

The apparatus of this invention has been described in detail above, but it is not intended that the invention shall be limited by that description, but only according to that description taken together with the accompanying claims.

We claim:
1. In combination:
 a ring laser, including at least three thin film dielectric corner mirrors, each rigidly supported by its substrate and having a narrow reflective laser band width to reflect counterpropagating laser beams around a closed path, the two beams at each said mirror defining a laser-beam-plane;

a composite combining prism, mounted upon the outside of and optically cooperating with the substantially planar outer surface of said substrate of one of said corner mirrors, said cooperating corner mirror being partly transmissive of said beams;

said composite combining prism comprising first and second substantially identical juxtaposed and touching sub-prisms at a common planar boundary, rectangular in cross-section having a thin film dielectric beam splitter, with a narrow bandwidth around the beam frequency, at said common boundary to cause said composite prism to be substantially symmetrical relative to said common boundary;

said sub-prisms being configured and positioned along an outer surface thereof with the long direction of said outer surface in contact with, and said common planar boundary perpendicular to, said substantially planar outer surface of said substrate to receive a portion of said counterpropagating laser beams, said sub-prisms having substantially planar, substantially forty five degree faces on one end thereof intercepting said beams and turning said beams substantially ninety degrees toward said beam splitter;

said sub-prisms being configured and positioned to deliver said beams in symmetrical paths to opposite faces of said beam splitter with said beams arriving at said beam splitter at angles to combine said beams into two combined beams;

said common planar boundary composite prism being turned slightly, about an optical offset axis parallel to said common planar boundary, parallel to said laser-beam-plane, and perpendicular to said corner mirror; and at least one heterodyne dual-light-sensor positioned to receive at least one of said combined beams from said beam splitter to produce moving interference fringes whose count rate is a measure of angular velocity of said ring laser about its sensing axis.

2. Apparatus as recited in claim 1 wherein said at least one heterodyne dual-light-sensor comprises two heterodyne dual-light-sensors, each intercepting a different one of said composite beams.

3. Apparatus as recited in claim 1 wherein said at least one heterodyne light-sensor comprises two heterodyne dual-light-sensors, each intercepting a different one of said composite beams.

4. Apparatus as recited in claim 1 and further comprising first and second auxiliary prisms attached to said first and second sub-prisms, respectively, intercepting said beams; and at least one auxiliary light amplitude sensor, positioned on at least one of said auxiliary prisms to sense the amplitude of at least one of said beams, the signals from said last-named sensors being useful to control and adjust the cavity length of said ring laser gyro.

5. Apparatus as recited in claim 4 in which there are two auxiliary light amplitude sensors, one positioned on each said auxiliary prism.

6. Apparatus as recited in claim 1 and further comprising absorbing means on said common planar boundary, except in the region of said beam splitter, for absorbing laser beams.

7. In combination:

a dielectric mirror on a substrate having substantially parallel faces;

first and second sub-prisms, fabricated of the same material as said substrate, each having a rectangular first face and forming a rectangular cylinder extending parallel to and attached to the opposite side of said substrate from said mirror, said sub-prisms having a forty five degree face on a first end thereof to re-direct lases beams along said cylinder, said sub-prisms being juxtaposed with one face of each in contact with a corresponding face of the other and defining an axis on said common face and centered on said forty five degree face, and a dielectric beam splitter on said axis at said common face, the outer ends of said cylinders being inclined from said common face toward said substrate to support at least one light heterodyne sensor.

8. Apparatus as recited in claim 7 and further comprising means for absorbing laser beams on said common faces except in the region of said beam splitter.

* * * * *